United States Patent [19]

Nobuyuki

[11] Patent Number: 5,227,899
[45] Date of Patent: Jul. 13, 1993

[54] LIQUID CRYSTAL DISPLAY DEVICE WITH LOW RESISTANCE FILM SEPARATED FROM ONE OF TWO ADJACENT ELECTRODES BY AN INSULATING FILM

[75] Inventor: Itoh Nobuyuki, Nara, Japan
[73] Assignee: Sharp Kabushiki Kaisha, Osaka, Japan
[21] Appl. No.: 755,109
[22] Filed: Sep. 5, 1991

[30] Foreign Application Priority Data

Sep. 7, 1990 [JP] Japan .................. 2-237451

[51] Int. Cl.⁵ .................. G02F 1/1343; G02F 1/1335; G02F 1/1333
[52] U.S. Cl. ..................... 359/54; 359/67; 359/79; 359/87
[58] Field of Search .................. 359/87, 54, 67, 79

[56] References Cited

U.S. PATENT DOCUMENTS

| 4,747,671 | 5/1988 | Takahashi et al. | 359/87 |
| 5,000,545 | 3/1991 | Yoshioka et al. | 359/87 |
| 5,007,716 | 4/1991 | Hanyu et al. | 359/87 |

FOREIGN PATENT DOCUMENTS 61-46931 3/1986 Japan .
63-296020 12/1988 Japan .
1-179915 7/1989 Japan .
1-280724 11/1989 Japan .
2-063019 3/1990 Japan .

OTHER PUBLICATIONS

Patent Abstracts of Japan, vol. 11, No. 134(P-571(2581) Apr. 28, 1987 and JP-A-61-273 522.

*Primary Examiner*—William L. Sikes
*Assistant Examiner*—Anita Pellman Gross
*Attorney, Agent, or Firm*—David G. Conlin; George W. Neuner

[57] ABSTRACT

A liquid crystal display device which comprises a pair of translucent substrates which are each provided on their surfaces with a plurality of parallel linear transparent electrodes, the surfaces being covered with orientation films, the pair of translucent substrates being so arranged as opposing to each other that the extending directions of the linear transparent electrodes on the two substrates intersect, a liquid crystal composition being placed between the substrates, wherein each of regions between the linear transparent electrodes on at least one of the translucent substrates is shielded and cut off of light by a non-translucent low resistive conductive film which is electrically connected with one of the adjacent linear transparent electrodes defining the regions but is disconnected from the other of the adjacent electrodes by an insulating film.

7 Claims, 6 Drawing Sheets

LIQUID CRYSTAL DISPLAY DEVICE WITH LOW RESISTANCE FILM SEPARATED FROM ONE OF TWO ADJACENT ELECTRODES BY AN INSULATING FILM

BACKGROUND OF THE INVENTION

1. Field of the Invention

The invention relates to a liquid crystal display device and more particularly to a liquid crystal display device using ferroelectric liquid crystals.

2. Description of the Related Art

In recent years, display devices have played, as an information transmitting means, an important part in development of information apparatuses including microcomputers and the like. A typical display device is CRT (cathode ray tube), while liquid crystal display devices have been broadly used recently since they can be miniaturized in construction and can be reduced in power consumption. A liquid crystal display device of a larger screen and capacity is further strongly expected to be realized.

Given attention now are liquid crystal display devices using ferroelectric liquid crystals capable of exhibiting chiral smectic phases. The ferroelectric liquid crystals have a spiral construction in chiral smectic phase usually. When they are sealed in a thin cell, an interface effects to loosen the spiral construction, so that there coexist some domains wherein liquid crystal molecules 18 tilt at $+\Theta$ with respect to normal line 17 of the smectic layer and other domains wherein the liquid crystal molecules 18 tilt reversely at $-\Theta$ with respect to the normal line, as shown in FIG. 6A. Voltage is applied to the domains to cause the liquid crystal molecules to show uniform spontaneous polarization as oriented unidirectionally as shown in FIG. 6B. When voltage is reversed, the liquid crystal molecules are oriented uniformly in a reverse direction to that of FIG. 6B as shown in FIG. 6C. In the light of the fact that birefringence changes following application of voltage in a normal and reverse direction as shown, a polarizing plate may be used to constitute a liquid crystal display device.

The liquid crystal display device can keep the initial molecular orientation as shown in FIG. 6D due to an orientation restraining force by the interfaces even after electric field is vanished, thereby exhibiting a high memorizing effect which is quite effective for a high duty multiplex drive display. For obtaining the above memorizing effect in the two states of the tilt angles $+\Theta$ and $-\Theta$, it is required to reduce difference of the orientation restraining force between upper and lower transparent substrates to diminish asymmetry of oriented liquid crystal molecules so as to allow coexistence of specific domains of the molecules tilted at $+\Theta$ and $-\Theta$, respectively.

A typical prior art of this kind of liquid crystal display device is as shown in FIG. 7, wherein a pair of transparent substrates 21 and 22 have on their opposite surfaces linear transparent electrodes 23 and 24 which are arranged as stripes forming a matrix electrode structure, insulating layers 25 and 26, and orientation films 27 and 28, respectively. Ferroelectric liquid crystals 29 are sealed between the transparent substrates 21 and 22, and polarizing plates 30 and 31 are laid on the outer surfaces of the substrates, thereby forming a ferroelectric liquid crystal display device 32.

The liquid crystal display device has diminished asymmetry in orientation of the liquid crystal molecules to obtain memorizing effect of the two states in which liquid crystal molecules tilt at $+\Theta$ and $-\Theta$.

The conventional liquid crystal display device is not applied with voltage at a region (non-pixel part) other than intersections (pixel part) of the extending directions of the linear transparent electrodes 23 and 24 and has diminished asymmetry in orientation of liquid crystals, so that it includes both of the foregoing two kinds of domains wherein the liquid crystal molecules tilt at $+\Theta$ and $-\Theta$, respectively. Hence, the non-pixel part 35 on the screen of the liquid crystal display, when light passes therethrough, has bright and dark (as hatched) regions to cause the screen to look rough, resulting in that displayed images cannot be given a uniform quality and are deteriorated in grade.

When the conventional liquid crystal display device is driven, voltage is applied from one ends of the linear transparent electrodes. If the linear transparent electrodes have large electrical resistance, voltage substantially decays at the other ends of the electrodes. As a result, voltage to be applied to liquid crystal layers is not uniform, leading to non-uniformity of display properties of the liquid crystal display device. The problem may be solved by such method as shown in Japanese Unexamined Patent Publication No. 63019/1990 that a conductive film as of metal having lower electrical resistance in comparison with the linear transparent electrodes is disposed lengthwise of and in contact with the electrodes to lower electrical resistance thereof. Further, ferroelectric liquid crystal device in the conventional example has such problem of inversion of the memory states in pixels. An electric field is applied to liquid crystal molecules to bring them into the state as shown in FIG. 6(d) followed by switching them to the state of FIG. 6(b). When the electric field is taken out, the liquid crystal molecules are not kept in the state of FIG. 6(b) but return to the state of FIG. 6(d). The phenomenon has been explained that it arises due to reverse electric field which is to be generated by spontaneous polarization of the ferroelectric liquid crystals [Yoshida, et al; 13th Liquid Crystal Forum Report, 2Z15(1987)]. A further study details that the inversion of memory states tends to arise at edges of the electrodes. Japanese Unexamined Patent Publication No. 179915/1989) A metal wiring has been reported to be effective for prevention of occurrence of the inversion of memory states. (Japanese Unexamined Patent Publications Nos. 179915/1989, 280724/1989 and 63019/1990) Metal or the like when arranged on the linear transparent electrodes narrows the transparent part thereof, so that substantial numerical aperture of the display is made smaller. Also, the metal or the like when disposed also at non-pixel part to prevent lowering of the numerical aperture is apt to contact with an adjacent linear transparent electrode, so that voltage is applied also to other linear transparent electrodes than a selected one, resulting in that quality of displayed image deteriorates.

SUMMARY OF THE INVENTION

The present invention has been designed to overcome the problems of the conventional art under the above circumstance. An object of the invention is to provide a liquid crystal display device wherein there is no mixture of bright and dark regions in the non-pixel part, thereby achieving a uniform bright and dark displaying without decay of voltage applied to linear transparent electrodes but with uniform displaying properties and an improved quality of displayed image.

According to the present invention, there is provided a liquid crystal display device which comprises a pair of translucent substrates which are each provided on their surfaces with a plurality of parallel linear transparent electrodes, the surfaces being covered with orientation films, the pair of translucent substrates being so arranged as opposing to each other that the extending directions of the linear transparent electrodes on the two substrates intersect, a liquid crystal composition being placed between the substrates, wherein each of regions between the linear transparent electrodes on at least one of the translucent substrates is shielded and cut off of light by a non-translucent low resistive conductive film which is electrically connected with one of the adjacent linear transparent electrodes defining the regions but is disconnected from the other of the adjacent electrodes by an insulating film.

PREFERRED EMBODIMENTS OF THE INVENTION

Figure 1:
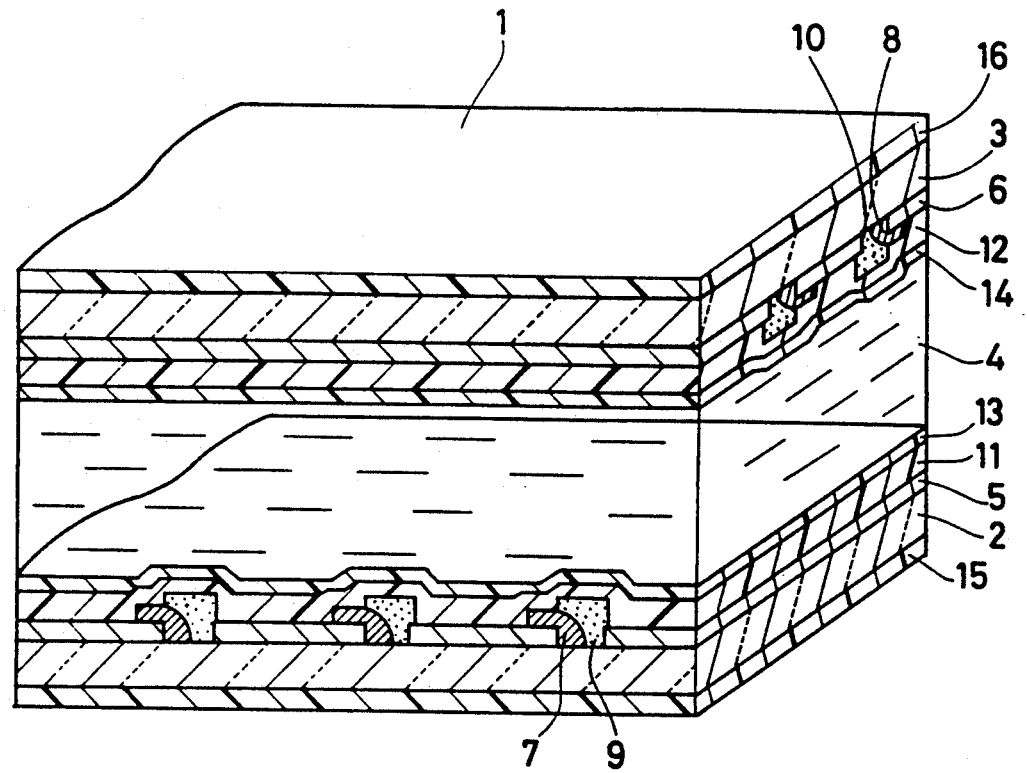
FIGS. 1 and 2 are diagrams showing liquid crystal display devices prepared in the examples of the present invention.

In the present invention, a number of parallel linear transparent electrodes are formed on the translucent substrates.

The translucent substrates may be made of glass or the like. The linear transparent electrodes and the corresponding ones on the respective substrates each so arranged as the extending directions of the electrodes being intersected are provided for applying voltage through the intersections to liquid crystals disposed between the substrates. A transparent conductive film may be prepared on the translucent substrate and etched in a predetermined pattern to form the linear transparent electrodes. The transparent conductive film may be ITO film (Indium Tin Oxide), $In_2O_3$, $SnO_2$ or the like in thickness of 0.05 to 0.3 $\mu m$.

The above pattern is provided by etching the transparent conductive film according to a customary method to form lines of 1 to 500 $\mu m$ in width. The linear transparent electrodes are preferably many and parallel to each other in intervals of 1 to 100 $\mu m$.

A longitudinally extending insulating film is formed above the ends of one of the adjacent transparent electrodes defining regions therebetween. The insulating film insulates the liner transparent electrodes for preventing short-circuiting between the adjacent linear transparent electrodes due to non-translucent low resistive conductive film which is to be formed on the insulating film. The insulating film may be provided on a surface of the translucent substrate forming the linear transparent electrodes and etched in a predetermined pattern. The insulating film may use $Ta_2O_5$, $Al_2O_3$, $ZnO$, $Y_2O_3$, $SiO_2$ or $SiN_x$ formed by sputtering, CVD process or the like, and its thickness is generally in the range from 1000 Å to 10000 Å preferably about 5000 Å from the viewpoint of relevant insulating efficiency. The pattern preferably allows the insulating film to extend lengthwise above one end of each linear transparent electrode and comprises layers covering an edge and upper surface of that one end.

Non-translucent low resistive conductive film is provided which shields regions between the adjacent linear transparent electrodes, keeping insulation between the electrodes through an insulating film while it is electrically connected with one of the pair of adjacent transparent electrodes. The non-translucent low resistive conductive film applies voltage to the linear transparent electrodes without occurrence of voltage drop in the longitudinal direction of the electrodes, and makes non-translucent the regions defined between the linear transparent electrodes. The conductive film preferably has non-translucency and resistivity less than $10^7 \Omega.cm$ and may be formed by that molybdenum, aluminum or titan is deposited according to sputtering, vacuum deposition or the like on the insulating film formed on the surface of transparent substrate and etched in a predetermined pattern. Thickness of the conductive film is 100 to 10000 Å, preferably 1000 to 2000 Å.

The above pattern allows the respective regions between the linear transparent electrodes to be electrically connected with one of the adjacent transparent electrodes defining the specific regions but is disconnected from the other adjacent electrode while kept insulated through an insulating film so as to be non-translucent substantially.

In the present invention, an orientation film may be disposed, through an insulating layer as or when required, on the surface having the non-translucent low resistive conductive film to constitute a transparent substrate for liquid crystals.

At least one of substrates provided with a number of parallel linear transparent electrodes and an orientation film formed thereon through an insulating film as or when required may use the above substrate for liquid crystals, and the substrates are arranged as opposing to each other, allowing the extending directions of the linear transparent electrodes to intersect and placing a liquid crystal composition between the substrates, thereby constituting a liquid crystal display device.

The non-translucent low resistive conductive film is adapted to be electrically connected with one of the adjacent linear transparent electrodes defining the specific regions and be disconnected from the other adjacent electrode through an insulating film by the conductive film's complete shielding of non-pixel part. Hence, the other parts than the pixel regions are shielded from light, thereby unifying the quality of displayed image. Also, decay of voltage to be applied to the electrodes can be lowered to unify voltage to be applied to the liquid crystal layer.

EXAMPLE 1

FIG. 1 shows a ferroelectric liquid crystal display device prepared by the example of the present invention. The ferroelectric liquid crystal display device 1 comprises a transparent substrate 2, 3 of glass which seal ferroelectric liquid crystals 4 therebetween. Linear transparent electrodes 5 and 6 are formed as stripes constituting a matrix structure on the opposite surfaces of the substrates 2 and 3. Non-translucent low resistive conductive films (molybdenum films) 9, 10 are provided as connected with one of the adjacent linear transparent electrodes but disconnected from the other adjacent electrode to provide a complete shading between the adjacent electrodes through an insulating film 7, 8. Also, an insulating film 11, 12 and an orientation film 13, 14 are layered in this order on the conductive films. Polarizing plates 15, 16 are disposed forming crossed-Nicols on the outer surfaces of the transparent substrates 2 and 3.

$Ta_2O_5$ is deposited on the substrates 2 and 3 to form the insulating films 7, 8 and molybdenum to form the non-translucent low resistive conductive films 9, 10 according to sputtering process, and etched into a shape as shown.

Figure 3A:
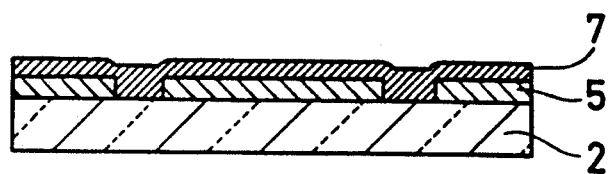
FIGS. 3A through 3G and 4A through 4G are diagrams showing a preparing process of non-translucent low resistive conductive film for the liquid crystal display device of the present invention.
Figure 3B:
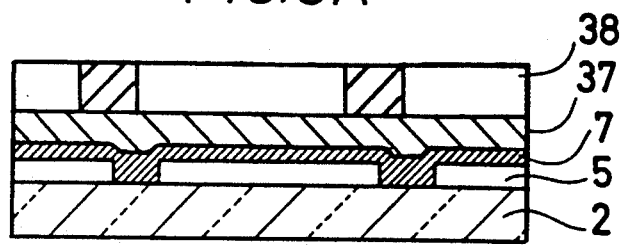
Figure 3C:
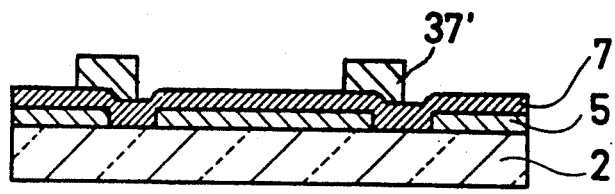
Figure 3D:
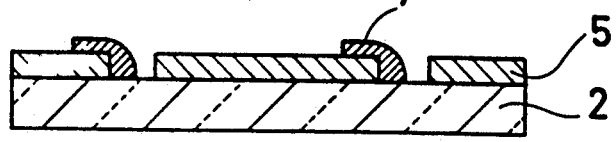
Figure 3E:
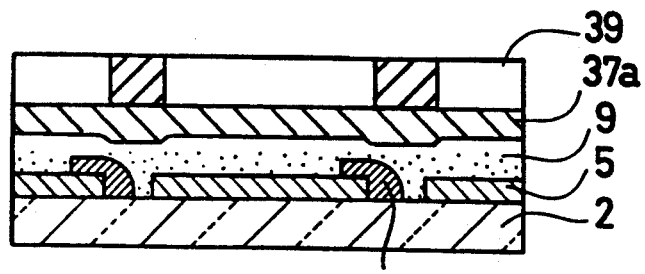
Figure 3F:
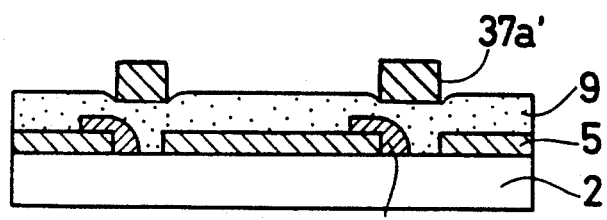
Figure 3G:
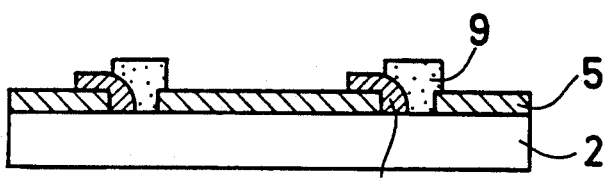

FIGS. 3A through 3G show a process for preparing the insulating films 7,8 and non-translucent low resistive conductive films 9, 10 on the transparent substrates 2, 3. First, on the substrate 2 on which the linear transparent electrodes 5 are formed as stripes $Ta_2O_5$ is deposited to form the insulating film 7 in thickness of 2000 Å as shown in FIG. 3A. Photoresist 37 is then coated thereon, as shown in FIG. 3B, and baked at 90° C. followed by application of light with high pressure mercury lamp through a photo-mask 38 in the shown shape and development of the pattern. Then, the product is baked again at 120° C. to form a photoresist pattern 37' as shown in FIG. 3C, and the $Ta_2O_5$ insulating film 7 except its portion covering one end of the adjacent linear transparent electrodes is peeled off as shown in FIG. 3D by plasma etching process using $CF_4$ followed by ashing with $O_2$ and peeling off the resist with a solution containing 2% of NaOH. Molybdenum film 9 as shown in FIG. 3E is formed according to sputtering process and subjected to the same process as FIGS. 3B and 3C using a photomask in the shown shape to form a photo resist pattern 37a' as shown in FIG. 3F. The product is etched for 3 min by use of a solution containing 25% of 5:1 mixture of $H_3PO_4$ and $HNO_3$ to peel off the molybdenum low resistive conductive film 9 except its portion which contacts with one the adjacent linear transparent electrodes and completely shuts light between the specific electrodes followed by peeling off the resist by use of a solution containing 2% of NaOH, as shown in FIG. 3G.

Although not shown in FIGS. 3A through 3G, the pattern is then spin-coated with $SiO_2$ (Tradename OCD TYPE-II, Tokyo Oka Inc.) and baked to form an insulating film 11 on which a solution of nylon 6 (Toray Industries) in 1% m-cresol was spin-coated followed by baking to form an orientation film 13.

The resultant orientation film 13 on the transparent substrate 2 and the orientation film 14 on the substrate 3 treated similarly with the process illustrated in FIGS. 3A through 3G are rubbed to be parallel or anti-parallel and configured into a cell in thickness of 2.0 μm in which ferroelectric liquid crystals are fed and sealed. Two polarizing plates 15 and 16 are disposed on the outer surface of the cell to form a liquid crystal display device shown in FIG. 1.

The liquid crystal display device comprises molybdenum film which has lower electrical resistivity than the linear transparent electrodes 2 and 3 and extends lengthwise thereof. Hence, voltage to be applied from one end of the electrodes 2, 3 does not decay at the other ends thereof, thereby achieving an excellent bistable memory at the pixel part of matrix electrodes over the whole screen and providing a uniform quality of displayed image at non-pixel part because of a complete cutting off of light by the molybdenum film.

In the present example, $Al_2O_3$, $ZnO$, $Y_2O_3$, $SiO_2$, $SiN_x$ in place of $Ta_2O_5$ were used as an insulating film to provide the same effect. Also, aluminum, titan or the like in place of molybdenum was used as non-translucent low resistive conductive film to provide the same effect.

An insulating film to be formed between the linear transparent electrodes and the non-translucent low resistive conductive film is 1000 Å–10000 Å preferably about 5000 Å in thickness to prevent the electrodes from contacting with the conductive film.

EXAMPLE 2

Figure 2:
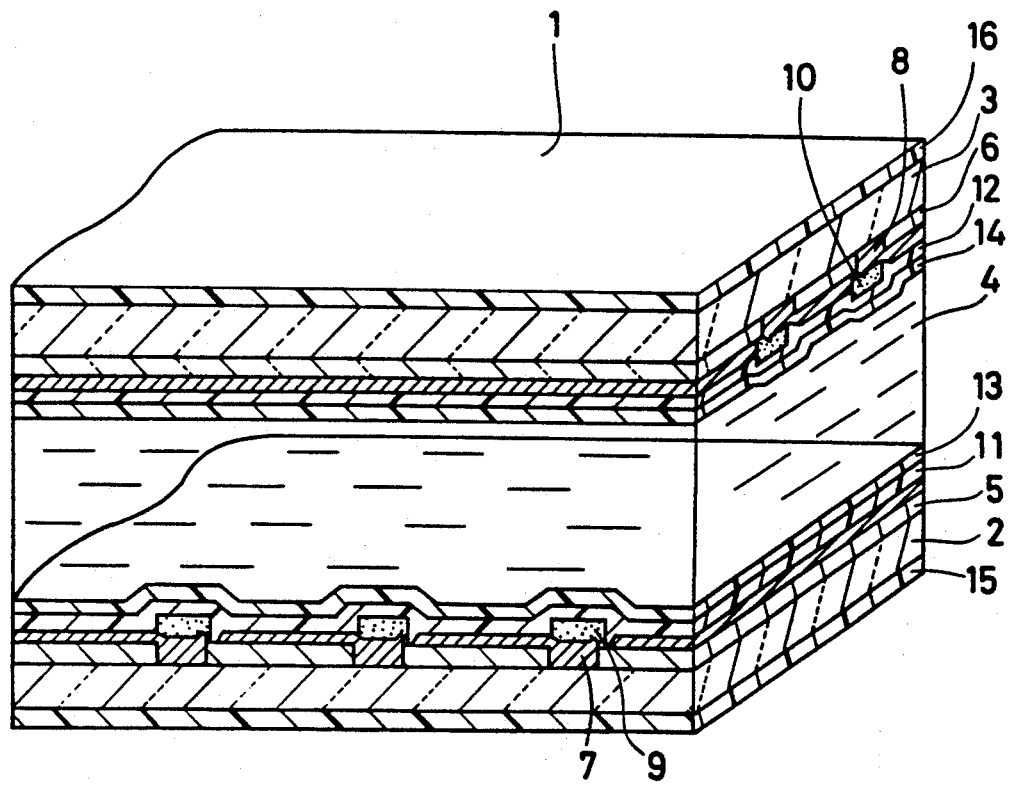

FIG. 2 shows a ferroelectric liquid crystal display device prepared by the example of the present invention. The ferroelectric liquid crystal display device 1 comprises a transparent substrate 2, 3 of glass which seal ferroelectric liquid crystals 4 therebetween. Linear transparent electrodes 5 and 6 are formed as stripes constituting a matrix structure on the opposite surfaces of the substrates 2 and 3. Non-translucent low resistive conductive films (molybdenum films) 9, 10 are provided as connected with one of the adjacent linear transparent electrodes but disconnected from the other adjacent electrode to provide a complete shading between the adjacent electrodes through an insulating film 7, 8. Also, an insulating film 11, 12 and an orientation film 13, 14 are layered in this order on the conductive films. Polarizing plates 15, 16 are disposed forming crossed-Nicols on the outer surfaces of the transparent substrates 2 and 3.

$Ta_2O_5$ is deposited on the substrates 2 and 3 to form the insulating films 7, 8 and molybdenum to form the non-translucent low resistive conductive films 9, 10 according to sputtering process, and etched into a shape as shown.

Figure 4A:
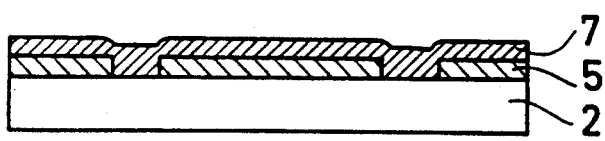
Figure 4B:
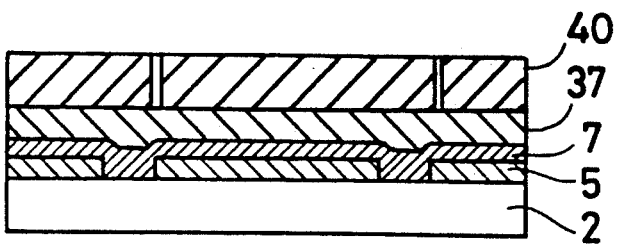
Figure 4C:
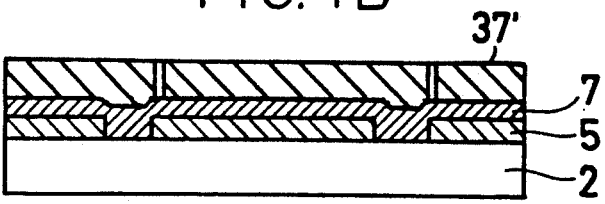
Figure 4D:
Figure 4E:
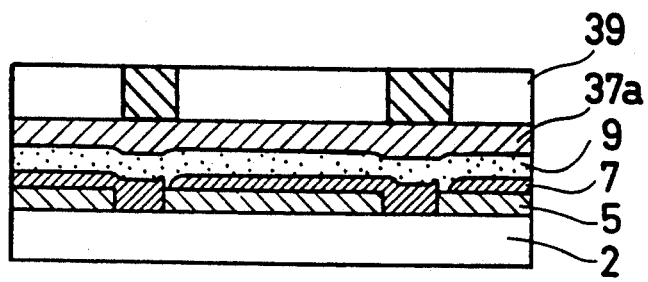
Figure 4F:
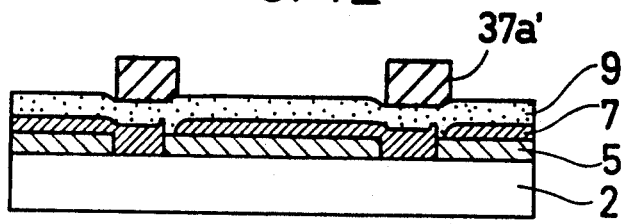
Figure 4G:
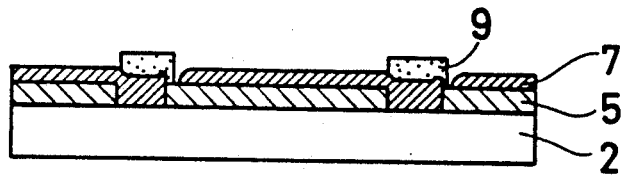
Figure 5:
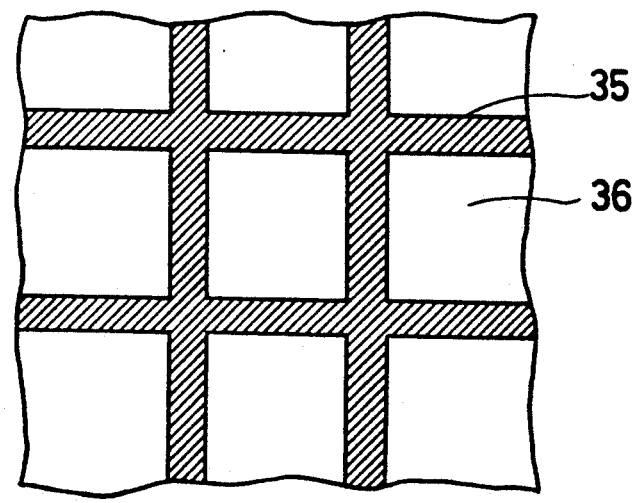
FIG. 5 is a diagram showing pixel part and non-pixel part in their displaying state.
Figure 6A:
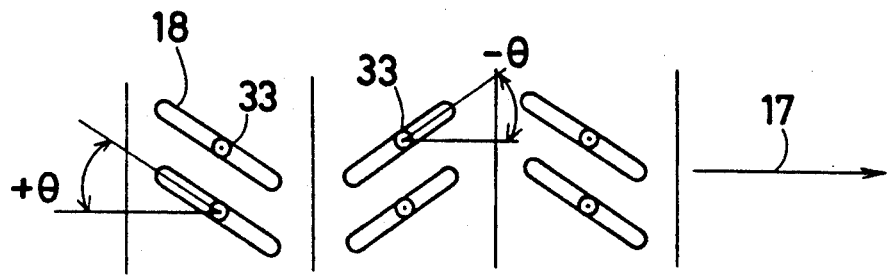
FIGS. 6A through 6D are an explanatory view of function of conventional ferroelectric liquid crystals.
Figure 6B:
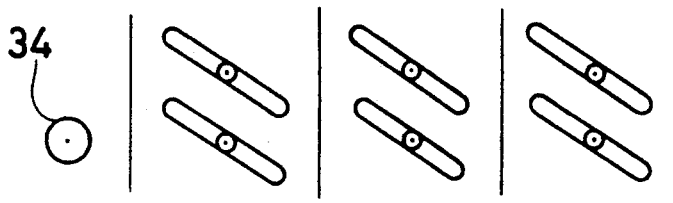
Figure 6C:
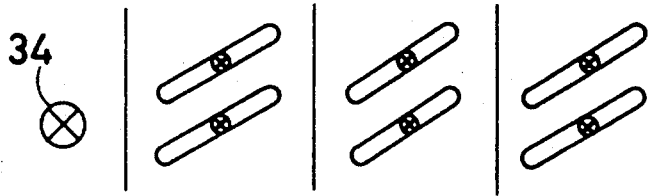
Figure 6D:
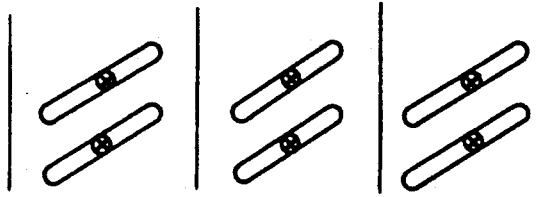
Figure 7:
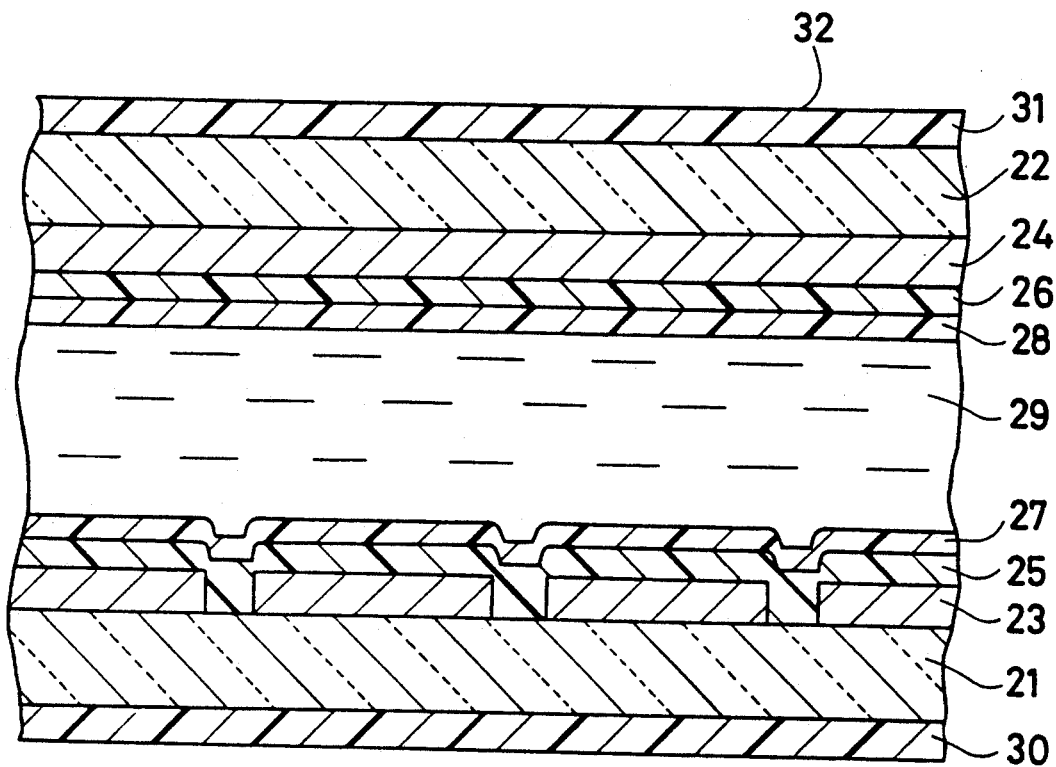
FIG. 7 is a diagram showing a conventional liquid crystal display device.
Figure 8:
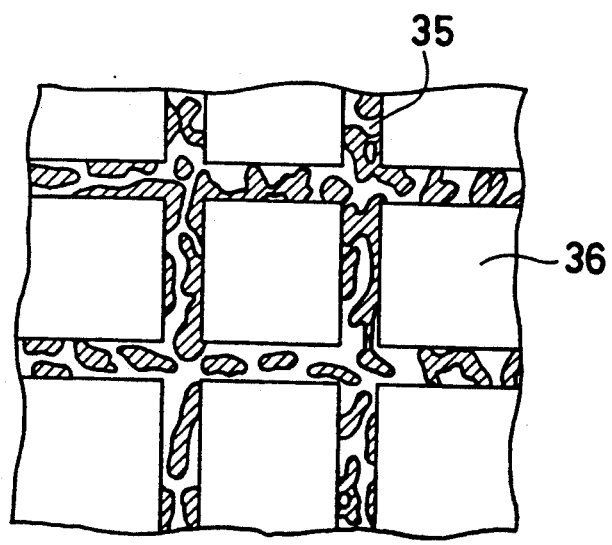
FIG. 8 is a diagram showing pixel part and non-pixel par in their displaying state.

FIGS. 4A through 4G show a process for preparing the insulating films 7,8 and non-translucent low resistive conductive films 9, 10 on the transparent substrates 2, 3. The drawings show only the case of transparent substrate 2. First, on the substrate 2 on which the linear transparent electrodes 5 are formed as stripes $Ta_2O_5$ is deposited to form the insulating film 7 in thickness of 2000 Å as shown in FIG. 4A. Photoresist 37 is then coated thereon, as shown in FIG. 4B, and baked at 90° C. followed by application of light with high pressure mercury lamp through a photo-mask 40 in the shown shape and development of the pattern. Then, the product is baked again at 120° C. to form a photoresist pattern 37' as shown in FIG. 4C, and the $Ta_2O_5$ insulating film 7 is peeled off by plasma etching using $CF_4$ to expose only one ends of the adjacent linear transparent electrodes as shown in FIG. 4D followed by ashing with $O_2$ and peeling off the resist with a solution containing 2% of NaOH. Molybdenum film 9 as shown in FIG. 4E is formed according to sputtering process and subjected to the same process as FIGS. 4B and 4C using a photomask 39 in the shown shape to form a photo resist pattern 37a' as shown in FIG. 4F. The product is etched for 3 min by use of a solution containing 25% of 5:1 mixture of $H_3PO_4$ and $HNO_3$ to peel off the molybdenum low resistive conductive film 9 except its portion which contacts with one the adjacent linear transparent electrodes and completely shuts light between the specific electrodes followed by peeling off the resist by use of a solution containing 2% of NaOH, as shown in FIG. 4G.

Although not shown in FIGS. 4A through 4G, the pattern is then spin-coated with $SiO_2$ (Tradename OCD TYPE-II, Tokyo Oka Inc.) and baked to form an insulating film 11 on which a solution of nylon 6 (Toray Industries) in 1% m-cresol was spin-coated followed by baking to form an orientation film 13.

The resultant orientation film 13 on the transparent substrate 2 and the orientation film 14 on the substrate 3 treated similarly with the process illustrated in FIGS. 3A through 3G are rubbed to be parallel or anti-parallel and configured into a cell in thickness of 2.0 $\mu$m in which ferroelectric liquid crystals are fed and sealed. Two polarizing plates 15 and 16 are disposed on the outer surface of the cell to form a liquid crystal display device shown in FIG. 2.

The liquid crystal display device comprises molybdenum film which has lower electrical resistivity than the linear transparent electrodes 2 and 3 and extends lengthwise thereof. Hence, voltage to be applied from one end of the electrodes 2, 3 does not decay at the other ends thereof, thereby achieving an excellent bistable memory at the pixel part of matrix electrodes over the whole screen and providing a uniform quality of displayed image at non-pixel part because of a complete cutting off of light by the molybdenum film.

In the present example, $Al_2O_3$, $ZnO$, $Y_2O_3$, $SiO_2$, $SiN_x$ in place of $Ta_2O_5$ were used as an insulating film to provide the same effect. Also, aluminum, titan or the like in place of molybdenum was used as non-translucent low resistive conductive film to provide the same effect.

An insulating film to be formed between the linear transparent electrodes and the non-translucent low resistive conductive film is preferably more than 1000 Å in thickness to prevent contact the electrodes and the conductive film.

As seen from the above, according to the present invention, voltage to be applied to the linear transparent electrodes does not decay. Also, by completely cutting off light at non-pixel part a uniform and bistable memory effect can be obtained at pixel part in the whole screen, and there causes no mixture of bright and dark regions at non-pixel part to thereby provide a uniform bright and dark displaying.

I claim:
1. A liquid crystal display device comprising:
   a pair of substrates spaced from each other;
   each substrate having on its inner surface a plurality of linear transparent electrodes arranged in parallel,
   each pair of adjacent electrodes on said surface being separated, an insulating film overlaying the edge of one electrode of each adjacent pair, the insulating film covering the edge surface and a portion of the top surface of the electrode at the edge, a low resistance, conductive film electrically connected to the opposing edge of the adjacent electrode and extending across the separation between the electrodes to the edge of the electrode overlayed with the insulating film so that the conductive film substantially blocks the transmission of light between the transparent electrodes, an orientation film overlaying the electrodes, insulating films and conducting films on said substrate;
   said pair of substrates being oppositely disposed such that the electrodes on one substrate intersect the electrodes on the opposing substrate and having a liquid crystal composition therebetween.
2. A liquid crystal display device according to claim 1 wherein the low resistive conductive film has resistivity less than $10^7$ $\Omega$.cm.
3. A liquid crystal display device according to claim 1 wherein the low resistive conductive film is made of molybdenum, aluminum or titanium.
4. A liquid crystal display device according to claim 1 wherein the low resistive conductive film is 100 to 10000 Å in thickness.
5. A liquid crystal display device according to claim 1 wherein the insulating film is made of $Ta_2O_5$, $Al_2O_3$, $ZnO$, $Y_2O_3$, $SiO_2$ or $SiN_x$.
6. A liquid crystal display device according to claim 1 wherein the insulating film is in the range from 1000 Å to 10000 Å in the thickness.
7. The liquid crystal device of claim 1, wherein an insulating film is overlayed on said conductive film and transparent electrodes.

* * * * *